United States Patent Office 3,428,704
Patented Feb. 18, 1969

3,428,704
ISOMERIZATION PROCESS
Norman A. Fishel, Lansing, Mich., assignor to Universal Oil Products Company, Des Plaines, Ill., a corporation of Delaware
No Drawing. Filed June 30, 1967, Ser. No. 650,200
U.S. Cl. 260—683.2           10 Claims
Int. Cl. C07c 5/28

ABSTRACT OF THE DISCLOSURE

An olefinic hydrocarbon is isomerized utilizing a catalyst comprising a crystalline aluminosilicate containing at least one metal from Group VIII of the Periodic Table chemically combined with a metal subfluoride vapor.

---

This invention relates to a conversion process for the isomerization of an isomerizable olefinic hydrocarbon into more useful compounds. More specifically, this invention is concerned with a conversion process for the isomerization of an isomerizable olefinic hydrocarbon utilizing a novel catalyst comprising a crystalline aluminosilicate containing at least one metal from Group VIII of the Periodic Table chemically combined with a metal subfluoride vapor.

I have discovered a catalyst which can be effectively employed in isomerization reactions in which, for example, the double bond of an olefinic hydrocarbon may be shifted to a more centralized position in the chain or the carbon skeleton arrangement of the compound may undergo rearrangement.

It is therefore an object of this invention to provide a process for the isomerization of isomerizable olefinic hydrocarbons utilizing a novel isomerization catalyst.

A specific object of this invention is to provide a novel method and a novel catalyst for isomerizing isomerizable olefinic hydrocarbons to provide the desired isomerized product in high yields without the inducing of other decomposition reactions.

One embodiment of the invention relates to a conversion process which comprises isomerizing an isomerizable olefinic hydrocarbon at a temperature in the range of from about 0° to about 425° C. and a pressure in the range of from about atmospheric to about 200 atmospheres in contact with a catalyst comprising a crystalline aluminosilicate containing at least one metal from Group VIII of the Periodic Table chemically combined with a metal subfluoride vapor.

Other objects and embodiments referring to alternative isomerizable olefinic hydrocarbons and to alternative catalytic compositions of matter will be found in the following further detailed description of the invention.

The process of my invention is applicable to the isomerization of isomerizable olefinic hydrocarbons including, for example, the isomerization of 1-butene to 2-butene, the isomerization of 3-methyl-1-butene to 2-methyl-2-butene. Also, the process of this invention can be utilized to shift the double bond of an olefinic hydrocarbon such as 1-pentene, 1-hexene, 2-hexene and 4-methyl-1-pentene to a more centrally located position so that 2-pentene, 2-hexene, 3-hexene and 4-methyl-2-pentene, respectively, can be obtained. It is not intended to limit this invention to those enumerated olefinic hydrocarbons set out above as it is contemplated that shifting of the double bond to a more centrally located position may be effected in straight or branched chain olefinic hydrocarbons containing up to about 20 carbon atoms per molecule according to the process of the present invention.

As set forth hereinabove, the process of my invention is applicable to the isomerization of olefinc hydrocarbons. Furthermore, these unsaturated hydrocarbons may be derived as selective fractions from various naturally occurring petroleum streams. For example, they may be separated as individual components, or as certain boiling range fractions by selective fractionation and distillation of catalytically cracked gas oil. Thus, the process of this invention may be successfully applied to and utilized for complete conversion of isomerizable olefinic hydrocarbons when these isomerizable olefinic hydrocarbons are present in minor quantities in various gas streams. Thus, the isomerizable olefinc hydrocarbon for use in the process of this invention need not be concentrated. For example, isomerizable olefinic hydrocarbons appear in minor quantities in various refinery gas streams, usually diluted with gases such as hydrogen, nitrogen, methane, ethane, propane, etc. These refinery streams containing minor quantities of isomerizable olefinic hydrocarbons are obtained in petroleum refineries from various refinery installations including thermal cracking units, catalytic cracking units, thermal reforming units, coking units, polymerization units, dehydrogenation units, etc. Such refinery off streams have in the past often been burned for fuel value, since an economical process for the utilization of their hydrocarbon content has not been available. This is particularly true for refinery gas streams known as off-gas streams containing relatively minor quantities of isomerizable olefinic hydrocarbons.

As hereinbefore set forth, the invention is concerned with a conversion process for the isomerization of isomerizable olefinic hydrocarbons, said process being effected in the presence of a catalyst which possesses a high degree of hydrocarbon conversion activity and is particularly effective as an isomerization catalyst for the isomerizable olefinic hydrocarbons hereinabove set forth. The catalyst comprises a crystalline aluminosilicate containing at least one metal from Group VIII of the Periodic Table combined with a metal subfluoride vapor. The crystalline aluminosilicates are composed of $SiO_4$ and $AlO_4$ tetrahedra, a silicon or aluminum atom being centered around four oxygen atoms in the tetrahedra and the oxygen being shared with other surrounding tetrahedra. These aluminosilicates are geometrically arranged to form a pore structure having sufficiently large pore size to permit the reactant molecules to pass into said pore structure. Preferably, the aluminosilicates employed in the catalyst support have pore sizes of from about 4 up to about 15 Angstroms in cross-sectional diameter. The aluminosilicates are treated to improve their catalytic activity by techniques such as ion-exchange with suitable cations and thermal treatment. Ordinarily, the aluminosilicates are synthetically prepared in the alkali metal form (usually sodium) and there is one monovalent alkali metal cation associated with each aluminum centered tetrahedra (to maintain electrical neutrality). The aluminosilicates may be ion-exchanged with polyvalent cations such as calcium, magnesium, beryllium, rare earths, etc., to replace a substantial amount of the monovalent cations. This causes one polyvalent cation to be associated with more than one aluminum centered tetrahedra and if these tetrahedra are spread sufficiently far apart (due to the presence of silicon centered tetrahedra), areas of local electrical charge will be formed which aid in promoting catalytic reactions. Another treating technique to improve the catalyst activity of the aluminosilicates is to ion-exchange with ammonium ions followed by thermal treatment, preferably above 300° C. to convert the crystalline aluminosilicates to the hydrogen form.

There are numerous types of crystalline aluminosilicates, both synthetic and natural occurring. It is preferable that the pore mouths of the crystalline aluminosilicates have cross-sectional diameters of from about 4 to about 15 Angstrom units. Among the preferable crystalline aluminosilicates that are suitable are the hydrogen and/or polyvalent forms of faujasite, and mordenite, and especially preferable is the hydrogen form of mordenite. The concentration of crystalline aluminosilicate may be as high as 100% or the crystalline aluminosilicate may be held with a matrix which may be selected from the group consisting of silica, alumina, and silica-alumina mixtures.

As set forth hereinabove, the catalyst comprises a crystalline aluminosilicate containing at least one metal from Group VIII of the Periodic Table that is combined with a metal subfluoride vapor to effect combination of said crystalline aluminosilicate with the metal subfluoride. Typical metals from Group VIII of the Periodic Table for use in the present invention thus includes iron and the platinum group metals including platinum, palladium, ruthenium, rhodium, osmium, and iridium and mixtures thereof. It is preferred that the Group VIII component of my novel catalyst be selected from the group consisting of nickel, platinum, and palladium. The Group VIII component will normall be utilized in an amount of from about 0.01 to about 2.0 percent by weight. Particularly preferred metal subfluorides for use in my invention include the aluminum subfluorides including silicon difluoride due mainly to the relative ease in preparing these compounds, although the invention is not restricted to their use but may employ any of the known metal subfluorides insofar as they are adaptable. However, it is not intended to infer that different metal subfluorides which may be employed will produce catalysts which have identical effects upon any given organic reaction as each of the catalysts produced from different metal subfluorides and by slightly varying procedures will exert its own characteristic action.

The catalyst of the present invention comprises a crystalline aluminosilicate containing at least one metal from Group VIII of the Periodic Table combined with the metal subfluoride vapor so as to effect combination of said crystalline aluminosilicate with the metal subfluoride vapor and it is the particular association of these components which results in the unusual catalytic properties of this catalyst. The metal subflouride vapor may be combined with the crystalline aluminosilicate at temperatures in the range of 650° C. to about 1000° C. and at a pressure of from about subatmospheric to about 10 atmospheres. The formation of the metal subfluoride vapor, and especially the formation of aluminum monofluoride is accomplished by sweeping with a gas such as helium, argon or hydrogen, and preferably helium, a stoichiometric mixture of aluminum metal (melting point about 660° C.) and aluminum trifluoride (melting point greater than 1000° C.) which is heated to about 750 to 850° C. The crystalline aluminosilicate containing at least one metal from Group VIII of the Periodic Table which is then chemically combined with the aluminum monofluoride is placed in the downstream helium flow. The chemical combination takes place at temperatures in excess of 650° C. Fluoride concentrations of between 0.01 percent to about 5 percent (by weight) are preferred.

In an alternative method, the catalyst may be prepared by pelleting a mixture of aluminum powder with a stoichiometric excess of aluminum trifluoride, and mixing these pellets with the crystalline aluminosilicate containing at least one metal from Group VIII of the Periodic Table and then heating this support in vacuum in a furnace tube at elevated temperatures.

The process of this invention utilizing the catalyst hereinbefore set forth may be effected in any suitable manner and may comprise either a batch or a continuous type operation. The preferred method by which the process of the invention may be effected is a continuous type operation. One particular method is the fixed bed operation in which the isomerizable olefinic hydrocarbon is continuously charged to a reaction zone containing a fixed bed of the desired catalyst, said zone being maintained at the proper operating conditions of temperature and pressure, that is, a temperature in the range of from about 0° to about 425° C. or more, and a pressure including a pressure of from about atmospheric to about 200 atmospheres or more. The catalyst is suitable for either gas phase or liquid phase reactions so that the liquid hourly space velocity (the volume of charge per volume of catalyst per hour) may be maintained in the reaction zone in the range of from about 0.1 to about 20 or more, preferably in the range of from about 0.1 to about 10, or at a gaseous hourly space velocity in the range of from about 100 to about 1500 or more. The reaction zone may comprise an unpacked vessel or coil or may be lined with an adsorbent packing material. The charge passes through the catalyst bed in an upward, downward, or radial flow and the isomerized product is continuously withdrawn, separated from the reactor effluent, and recovered, while any unreacted starting materials may be recycled to form a portion of the feed stock. It is also contemplated within the scope of this invention that gases such as helium, hydrogen, nitrogen, argon, etc., may also be charged to the reaction zone if desired. Another continuous type operation comprises the moving bed type in which the isomerizable olefinic hydrocarbon and the catalyst bed move either concurrently or countercurrently to each other while passing through said reaction zone.

Still another type of operation which may be used is the batch type operation in which a quantity of the isomerizable olefinic hydrocarbon and the catalyst are placed in an appropriate apparatus such as, for example, a rotating or stirred autoclave. The apparatus is then heated to the desired temperature and maintained thereat for a predetermined residence time at the end of which time the flask and contents thereof are cooled to room temperature and the desired reaction product is recovered by conventional means, such as, for example, by washing, drying, fractional distillation, crystallization, etc.

The following examples are introduced for the purpose of illustration only with no intention of unduly limiting the generally broad scope of the present invention.

Example I

A quartz vessel with provisions for connection to a vacuum system is filled with a mixture of about 100 grams of a 5A crystalline aluminosilicate containing about 0.5 weight percent palladium and having a 2:1 silica to alumina mol ratio and about 26 grams of ⅛ inch pellets comprising about 20% aluminum metal and about 80% aluminum trifluoride by weight. The contents of the vessel were outgassed at a pressure of less than $10^{-4}$ mm. while slowly being heated in a tube furnace. Approximately 4½ hours were allowed for the system to reach 600 to about 650° C. The evacuated vessel was then sealed off. The vessel was then placed in a muffle furnace at 750° C. for 1 hour and rotated slowly to aid mixing.

The sealed vessel was cooled to room temperature. After cooling, the vessel was opened in a helium dry box, the somewhat greyish catalyst spheres were separated from the pellets and the catalyst was then placed in vessels which were then sealed. This catalyst is designated as catalyst A.

Example II

In this example, a volatile fluoride (800° C.) is prepared by sweeping with helium a stoichiometric mixture of aluminum metal (melting point 660° C.) and aluminum trifluoride (melting point greater than 1000° C.) which is heated to 750–800° C. Aluminum monofluoride is then produced. A catalyst base in the form of hydrogen form faujasite ⅛ inch diameter pills containing about 0.75 weight percent platinum is then placed in the downstream helium flow and the aluminum monofluoride is chemically combined with the base at a temperature in excess of 650° C.

The catalyst produced by this vapor deposition and chemical combination of the aluminum monofluoride with the hydrogen form faujasite containing platinum has fluoride levels of less than 5 percent by weight fluoride chemically combined therewith. This catalyst is designated as catalyst B.

Example III

A volatile fluoride (800° C.) is prepared by sweeping with helium a stoichiometric mixture of aluminum metal (melting point 660° C.) and aluminum trifluoride (melting point greater than 1000° C.) which is heated to 750–800° C. Aluminum monofluoride is then produced. A catalyst base in the form of hydrogen from mordenite 1/16 inch diameter spheres containing about 0.75 weight percent platinum are prepared and placed in the downstream helium flow and the aluminum monofluoride is chemically combined with the base at a temperature in excess of 650° C.

The catalyst produced by this vapor deposition and chemical combination of the aluminum monofluoride with the hydrogen form mordenite containing platinum has fluoride levels of less than 5 weight percent of fluoride chemically combined therewith. This catalyst is designated as catalyst C.

Example IV

The catalyst designated as catalyst A prepared according to Example I above is utilized in an isomerization reaction, the finished catalyst being placed in an appropriate continuous isomerization apparatus. In the experiment, 1-butene along with hydrogen is charged to the isomerization zone. The reactor is maintained at about 100 p.s.i.g. and 140° C. Substantial conversion of the 1-butene to cis- and trans-2-butene is obtained as is evidenced by gas-liquid chromatography.

Example V

The catalyst prepared according to Example II and designated as catalyst B is utilized in an appropriate isomerization apparatus to determine the isomerization activity of said catalyst. In the experiment, a fresh batch of finished catalyst is placed in the isomerization reaction zone and 3-methyl-1-butene and hydrogen charged thereto. The reactor is maintained at about 125 p.s.i.g. and about 180° C. Substantial conversion of the 3-methyl-1-butene to 2-methyl-2-butene is obtained as is evidenced by gas-liquid chromatography.

Example VI

A portion of the catalyst prepared according to Example III and designated as catalyst C is utilized in an appropriate continuous isomerization apparatus to determine the isomerization activity of said catalyst. In the experiment, the catalyst is placed in the isomerization reaction zone and cyclohexene along with hydrogen is charged to said reaction zone. The reactor is maintained at about 135 p.s.i.g. and a temperature of about 185° C. Gas-liquid chromatographic analyses of the product stream indicate that substantial conversion of the cyclohexene occurs.

Example VII

A second portion of the catalyst prepared according to Example III and designated as catalyst C is again utilized in an appropriate continuous isomerization apparatus. In the experiment, the finished catalyst is placed in the isomerization reaction zone and 1-pentene along with hydrogen is charged to said reaction zone. The reactor is maintained at about 115 p.s.i.g. and about 190° C. Substantial conversion of the 1-pentene to 2-pentene is obtained as is evidenced by gas-liquid chromatography.

I claim as my invention:

1. The process of isomerizing an isomerizable olefinic hydrocarbon at an isomerizing temperature of from about 0° C. to about 425° C. and a pressure of from about atmospheric to about 200 atmospheres in contact with a crystalline aluminosilicate containing a metal from Group VIII of the Periodic Table and which has been chemically combined with a fluoride selected from the group consisting of aluminum subfluoride vapor and silicon subfluoride vapor at a temperature of from about 650° C. to about 1000° C.

2. The process of claim 1 further characterized in that said fluoride is aluminum monofluoride and that said crystalline aluminosilicate contains silica and alumina tetrahedra having uniform pores of between 4 and 15 Angstroms.

3. The process of claim 2 further characterized in that said silica and alumina tetrahedra having uniform pores of between 4 and 14 Angstroms are suspended in an alumina matrix.

4. The process of claim 2 further characterized in that said silica and alumina tetrahedra having uniform pores of between 4 and 15 Angstroms are suspended in a silica matrix.

5. The process of claim 2 further characterized in that said silica and alumina tetrahedra having uniform pores of between 4 and 15 Angstroms are suspended in a silica-alumina matrix.

6. The process of claim 2 further characterized in that said crystalline aluminosilicate is the hydrogen form of faujasite and the Group VIII metal is selected from the group consisting of nickel, platinum and palladium.

7. The process of claim 2 further characterized in that said crystalline aluminosilicate is the hydrogen form of mordenite and the Group VIII metal is selected from the group consisting of nickel, platinum and palladium.

8. The process of claim 2 further characterized in that said isomerizable olefinic hydrocarbon is 1-butene.

9. The process of claim 2 further characterized in that said isomerizable olefinic hydrocarbon is 3-methyl-1-butene.

10. The process of claim 2 further characterized in that said isomerizable olefinic hydrocarbon is cyclohexene.

References Cited

UNITED STATES PATENTS 3,370,099   2/1968   Plank _____ 260—666

DELBERT E. GANTZ, *Primary Examiner.*

V. O. KEEFE, *Assistant Examiner.*

U.S. Cl. X.R.

260—666